United States Patent
Ando (10) Patent No.: US 7,734,655 B2
(45) Date of Patent: Jun. 8, 2010

(54) METHOD OF MANAGING DATA ON RECORDING MEDIUM

(75) Inventor: Tsutomu Ando, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 530 days.

(21) Appl. No.: 10/856,961

(22) Filed: Jun. 1, 2004

(65) Prior Publication Data

US 2004/0250015 A1    Dec. 9, 2004

(30) Foreign Application Priority Data

Jun. 9, 2003    (JP) ............................. 2003-164332

(51) Int. Cl.
  *G06F 17/00*    (2006.01)
(52) U.S. Cl. .................. 707/802; 711/112; 711/156
(58) Field of Classification Search ................. 711/112, 711/156
  See application file for complete search history.

(56) References Cited

U.S. PATENT DOCUMENTS

| | | | | |
|---|---|---|---|---|
| 6,056,197 | A * | 5/2000 | Hara et al. ................... 235/454 |
| 6,567,502 | B2 * | 5/2003 | Zellner et al. .................. 379/45 |
| 6,842,761 | B2 * | 1/2005 | Diamond et al. ......... 707/104.1 |
| 7,246,127 | B2 * | 7/2007 | Murakami et al. .......... 707/100 |
| 2002/0078819 | A1 * | 6/2002 | Kim ............................. 84/609 |
| 2002/0149682 | A1 * | 10/2002 | Kudo ....................... 348/231.4 |
| 2003/0028397 | A1 | 2/2003 | Tagashira et al. .............. 705/1 |
| 2003/0083948 | A1 * | 5/2003 | Rodriguez et al. ............ 705/26 |
| 2003/0177093 | A1 * | 9/2003 | Hirano et al. ................. 705/50 |
| 2003/0182297 | A1 * | 9/2003 | Murakami et al. .......... 707/100 |
| 2003/0232593 | A1 * | 12/2003 | Wahlroos et al. ........... 455/3.05 |
| 2004/0047597 | A1 * | 3/2004 | Hirabayashi et al. .......... 386/69 |
| 2004/0096200 | A1 * | 5/2004 | Chen et al. ................... 386/125 |
| 2005/0111831 | A1 * | 5/2005 | Matsumi et al. ............... 386/95 |
| 2005/0125381 | A1 * | 6/2005 | Yamada et al. ................. 707/2 |

FOREIGN PATENT DOCUMENTS

JP    2002-314916    10/2002

* cited by examiner

*Primary Examiner*—Apu M Mofiz
*Assistant Examiner*—Thu Nga Nguyen
(74) *Attorney, Agent, or Firm*—Fitzpatrick, Cella, Harper & Scinto (57) ABSTRACT

A data management method which causes equipment such as a camera integral-type recording and reproducing apparatus to manage an external reference type container file and an audiovisual stream file by setting an attribution of all the external reference type container files recorded in a disk to an invisible state. Therefore, reproduction of the container file can be performed in the main body of the equipment, and only the audiovisual stream file can be reproduced when the disk is reproduced in, e.g. a personal computer.

16 Claims, 10 Drawing Sheets

FIG. 2

File Identifier Descriptor
```
struct FileIdentifierDescriptor {
    struct tag DescriptorTag;
    Unit16 File VersionNumber;
    Unit8 FileCharacteristics:
    Unit8 LengthofFileIdentifier;
    struct long_ad ICB;
    Unit16 LengthofImplementationUse;
    byte ImplementationUse[];
    char FileIdentifier[];
    byte Padding[];
}
```

Unit8 FileCharacteristics
The following sections describe the usage of the *FileCharacteristics* under various operating systems.

MS-DOS, OS/2, Windows 95, Windows NT, Macintosh
If Bit 0 is set to ONE, the file shall be considered a "hidden" file.
If Bit 1 is set to ONE, the file shall be considered a "directory."
If Bit 2 is set to ONE, the file shall be considered a "deleted."

```
struct FileEntry { /* ECMA 167 4/14.9 */
    struct tag DescriptorTag;
    struct icbtag ICBTag;
    Unit32 Uid;
    Unit32 Gid;
    Unit32 Permissions;
    Unit16 FileLinkCount;
    Unit8 RecordFormat;
    Unit8 RecordDisplayAttributes;
    Unit32 RecordLength;
    Unit64 InformationLength;
    Unit64 LogicalBlocksRecorded;
    struct tim estamp AccessTime;
    struct tim estamp ModificationTime;
    struct tim estamp AttributeTime;
    Unit32 Checkpoint;
    struct long_ad ExtendedAttributeICB;
    struct EntityID ImplementationIdentifier;
    Unit64 UniqueID;
    Unit32 LengthofExtendedAttributes;
    Unit32 LengthofAllocationDescriptors;
    byte ExtendedAttributes[];
    byte AllocationDescriptors[];
}
```

METHOD OF MANAGING DATA ON RECORDING MEDIUM

BACKGROUND OF THE INVENTION

1. Field of the Invention

The present invention relates to a method of managing data stored on a recording medium such as an optical disk.

2. Related Background Art

Currently the storage capacity of a data recording medium, such as a semiconductor memory card used in a digital still camera and a magneto-optical disk used in a digital disk recorder, has dramatically increased. Therefore, users can record a wide variety of data contents, such as a moving image, a sound, and a still image on the above data recording media.

Figure 9:
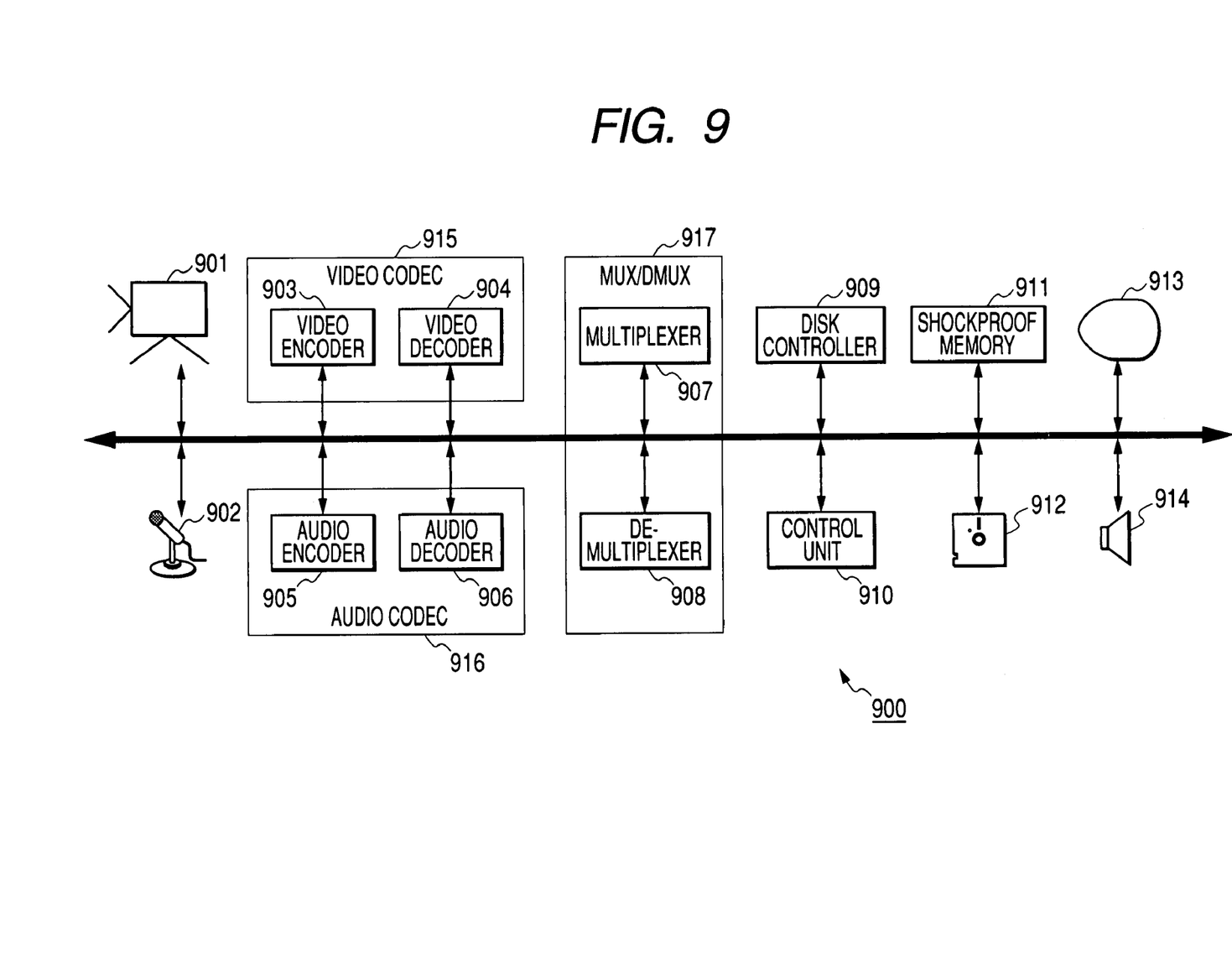
FIG. 9 is a block diagram showing an example of the configuration of a digital disk recording and reproducing apparatus.

FIG. 9 shows a configuration of a camera integrated-type disk recording and reproducing apparatus 900 as an example of product forms employing such a data recording medium.

For the disk recording and reproducing apparatus 900, the recording operation will be described first. The reference numeral 901 denotes a video input device which outputs a video signal obtained by photographing an object. The reference numeral 902 denotes an audio input device which outputs an audio signal collected usually by using a microphone. The reference numeral 903 denotes a video encoder which encodes the input video signal. The reference numeral 905 denotes an audio encoder which encodes the input audio signal. The reference numeral 907 denotes a multiplexer which multiplexes the encoded video data and the encoded audio data and performs synchronous control of the encoded video and audio data.

The reference numeral 909 denotes a disk controller which performs reading of and writing on a disk medium 912. The reference numeral 910 denotes a control unit which performs the control of the overall disk recording and reproducing apparatus 900. The reference numeral 912 denotes the disk medium (DISK) which stores the multiplexed and encoded video and audio data. The reference numeral 913 denotes a display device which displays a status of the apparatus, various kinds of setting screens, and a display image concerning the input video signal and the reproduced video signal. The reference numeral 914 denotes a speaker device which outputs the input audio signal and the reproduces audio signal. The recording operation is performed by the above-described configuration.

The reproducing operation will now be described. The reference numeral 911 denotes a shock-proof memory, and the shock-proof memory 911 is one which is used to temporarily store the data read out from the disk medium 912 and read out the data to supply the read out data continuously during a period when the disk medium 912 is not accessible due to vibration or shock. Further, in the recording, sometimes the shock-proof memory 911 is also used as a buffer when writing can not be performed onto the disk medium 912 due to the vibration.

The reference numeral 908 denotes a demultiplexer which performs demultiplexing and reproduction synchronous control of the reproduced and encoded video and audio data. The reference numeral 904 denotes a video decoder which decodes the encoded video data. The reference numeral 906 denotes an audio decoder which decodes the encoded audio data. The decoded video signal is subjected to reproduction display on the display device 913, and the decoded audio signal is subjected to reproduction output by the speaker device 914. In the reproduction, similarly to the case in the recording, the control unit 910 also performs the control of the overall disk recording and reproducing apparatus 900 and response to various kinds of functional requests from the user. The reproducing operation is performed by the above-described configuration. For example, the above-described disk recording and reproducing apparatus is disclosed in Japanese Patent Application Laid-Open No. 2002-314916.

The encoding/decoding processing of the video data and the encoding/decoding processing of the audio data are often attained with a common unit in the disk recording and reproducing apparatus. In FIG. 9, the video encoder 903 and the video decoder 904 are expressed in the form of a video codec 915 which is of the common unit, and the audio encoder 905 and the audio decoder 906 are expressed in the form of an audio codec 916 which is of the common unit. Further, the multiplexer 907 and the demultiplexer 908 are also expressed as a common unit (MUX/DMUX) 917.

In the usual apparatus which can record and reproduce the moving image, an encoding format of an international standard specification which is prescribed by MPEG (Moving Picture Experts Group) is often used as the method of encoding the video and audio data. The encoding format specifically includes MPEG-1, MPEG-2, MPEG-4, and the like.

The encoding formats such as MPEG-1, MPEG-2, and MPEG-4 only define a compression method and syntax of each medium. Without modification, in some cases, it is difficult that such the encoding format is handled as an individual application. Therefore, a container format which is easier to handle is usually used for the application of the personal computer and the like.

Specifically, the container format includes QuickTime (trademark), MP4, AVI format, and the like. The container format usually supports the plurality of audio and video encoding methods which is not limited to the MPEG. The reproducing application is characterized in that decoding processing is performed in such a manner that a built-in decoder is changed for each file by detecting an identifier expressing the encoding method set in the file.

Figure 7:
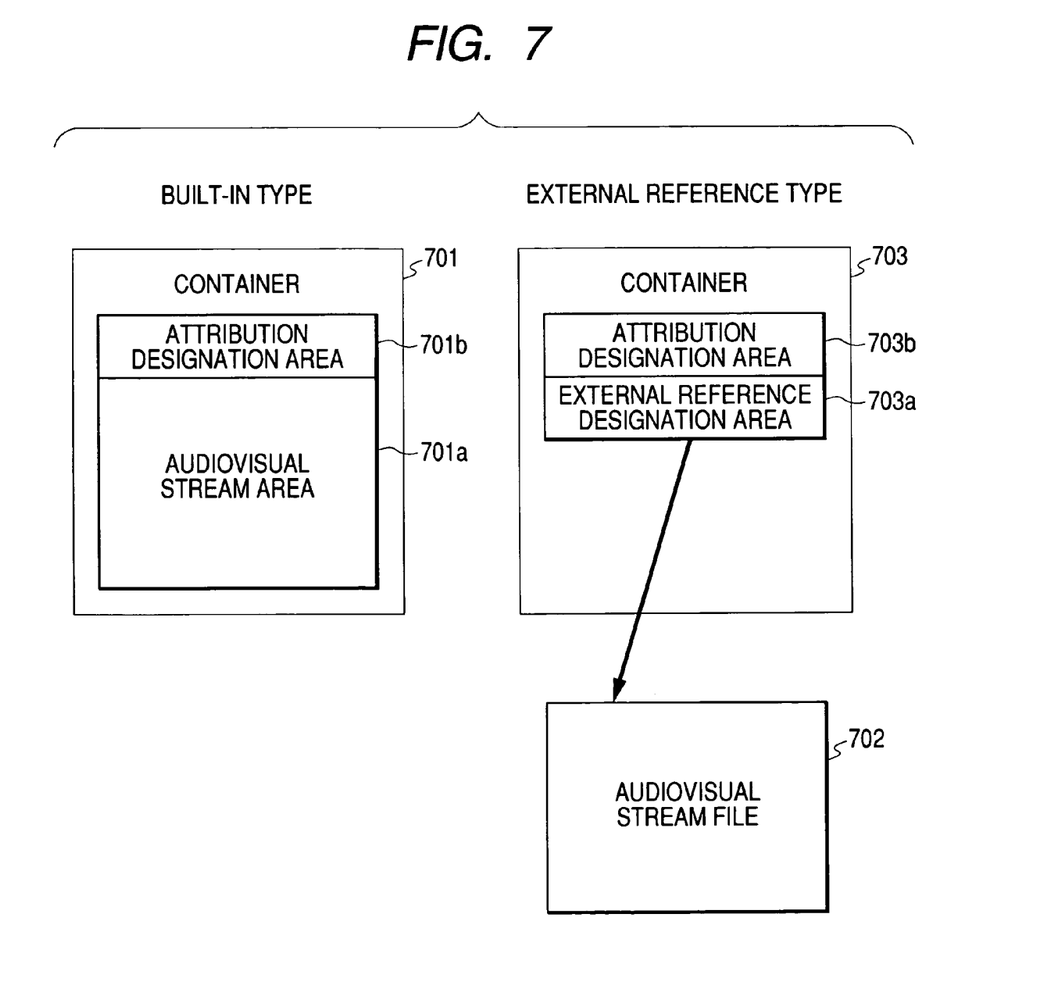
FIG. 7 shows a schematic diagram for explaining a built-in type container format and an external reference type container format.

As shown in FIG. 7, there are a built-in type and an external reference type as types of container formats. The built-in type has the configuration in which all media data (audiovisual stream) and attribution data are built in as one container file 701. The external reference type is one which externally refers to the media data (audiovisual stream file). The external reference type has a configuration in which the media data independently exists as a different file 702 and only attribution data of the media data and information designating a target reference of an external file are included as a container file 703.

The built-in type has in the container file 701a storage area 701a for the audiovisual stream and a storage area 701b for information designating an attribution of the audiovisual stream. In the external reference type, the audiovisual stream is filed and arranged in the external file 702, and the container file 703 has a reference designation area 703a for the external file 702 and an attribution designation area 703b.

Specifically, a file pass of the external file 702 in which the audiovisual stream exists is described in the reference designation area 703a of the external file 702. Sometimes a serial number (volume ID) of the recording medium is added to the file pass.

While the information designating the attribution of the external file 702 is stored in the attribution designation area 703b, in addition to environmental data such as recording data, file offset data is also often stored in the attribution designation area 703b to more efficiently perform random access reproduction of the data stream in the audiovisual reproduction. The file offset data is one which shows a relationship between the number of frames or time and a position of a file pointer.

UDF (Universal Disk Format) defined by OSTA (Optical Storage Trading Association) is already widely adopted as a file system in the disk medium such as a CD (Compact Disc) and a DVD (Digital Versatile Disc). Conformity to the file system such as UDF allows disk access independently of the apparatus and the operating system. In UDF, a function called a descriptor is used for defining a volume attribution or a file attribution of the disk medium.

Figure 8:
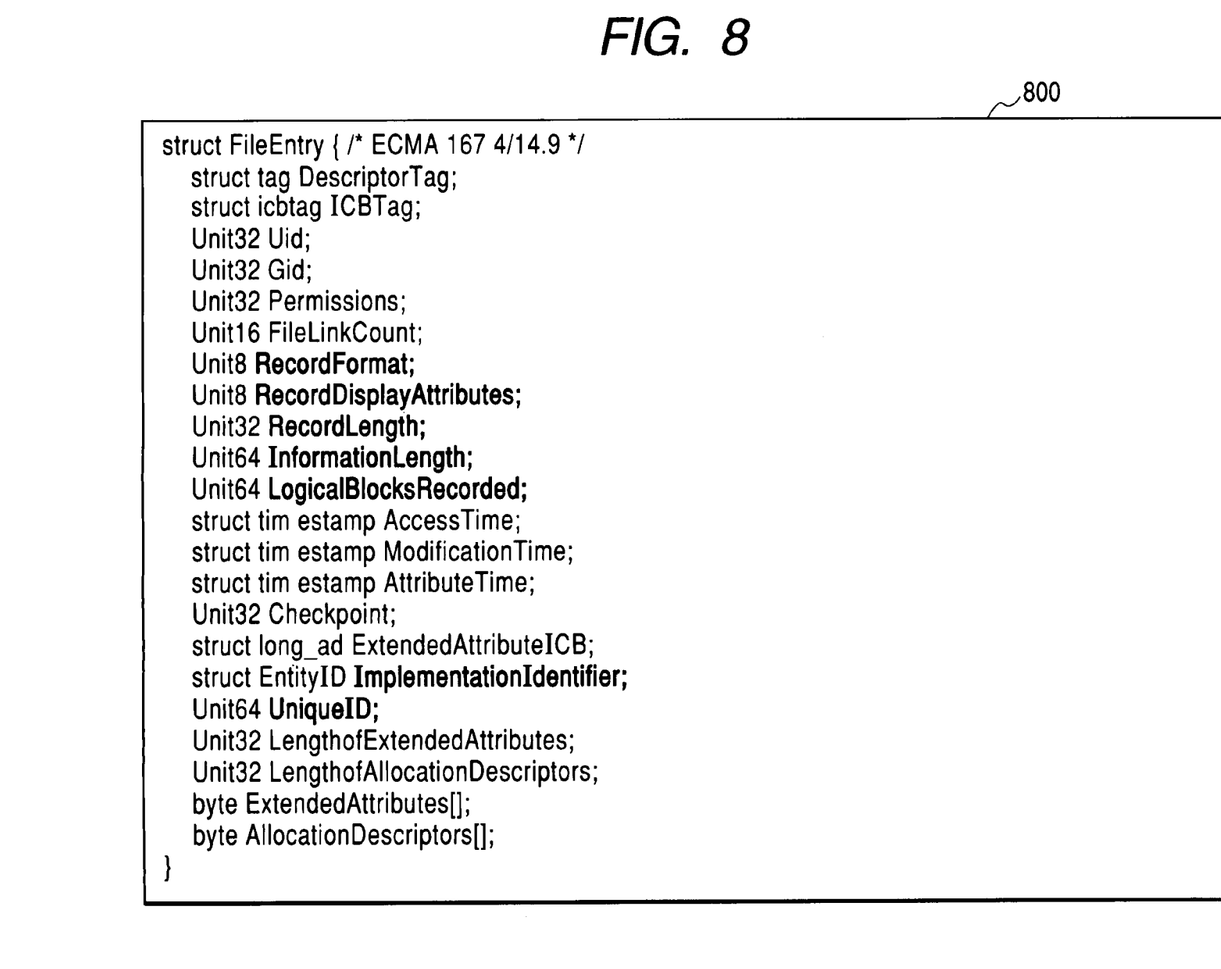
FIG. 8 shows an example of a descriptor in the UDF format.

The descriptor comes in many varieties, and FIG. 8 shows an example of descriptors. In the example shown in FIG. 8, a descriptor 800 is a definition of a file entry, and creation/change data, a recording format, and a file protection attribution can be written as the attribution.

However, the above-described method has the following problems.

The disk medium complying with UDF is not dependent on the apparatus and the operating system, and the disk medium can be directly mounted on various systems. However, in the case where the data stored in the disk medium is of an audio-visual standard which is not supported by the specific operating system or application, sometimes the data can not be reproduced, while the disk medium can be mounted.

In the case where the container format is used, there is a restriction in the video codec and the audio codec supported by the container format. Therefore, even if the audio visual data can be reproduced on the disk recording and reproducing apparatus, sometimes the audio visual data can not be reproduced when copied in a hard disk drive or the like in the external personal computer (PC).

Further, when the external reference type container format is used, the file pass of the target reference becomes different after the file is copied or moved, and sometimes the audiovisual data can not be normally reproduced.

SUMMARY OF THE INVENTION

An object of the present invention is to solve the above-described problems.

Another object of the invention is to provide a management method of data stored in the recording medium such as the optical disk, which can optimally reproduce the audio data and the video data in both a local apparatus and apparatuses other than it.

As a preferred embodiment for such objects, the invention discloses a data management method for managing data on a recording medium comprising a recording step of recording on the recording medium at least one data file in which at least one of video data and audio data is included, and an external reference type file for referring to the at least one data file, and a managing step of performing file management by setting an attribution of the external reference type file to an invisible state.

The invention also discloses a data management system comprising a recorder which records on a recording medium at least one data file in which at least one of video data and audio data is included, and an external reference type file for referring to the at least one data file, a file controller which sets an attribution of the external reference type file to an invisible state, and a display controller, which, when the recording medium is mounted to another apparatus, effects display control to prohibit displaying of information related to the external reference type file the attribution of which the file controller sets to the invisible state and permits the display of information related to the data file.

The invention further discloses a data management apparatus comprising a recorder which records on a recording medium at least one data file in which at least one of video data and audio data is included, and an external reference type file for referring to the at least one data file, a file controller which sets an attribution of the external reference type file to an invisible state, and a display controller which, when the recording medium is mounted to another apparatus, effects display control to prohibit displaying of information related to the external reference type file the attribution of which the file controller sets to the invisible state and permits the display of information related to the data file.

The invention still further discloses a recording apparatus for recording data on a recording medium, comprising a recorder which records on the recording medium at least one data file in which at least one of video data and audio data is included, and an external reference type file for referring to the at least one data file, and a file controller which sets an attribution of the external reference type file to an invisible state to manage the data file.

Still other objects of the present invention, and the advantages thereof, will become fully apparent from the following detailed description of the embodiments.

DETAILED DESCRIPTION OF THE PREFERRED EMBODIMENTS

The preferred embodiments of the present invention will now be described in detail hereinafter with reference to the accompanying drawings.

First Embodiment

Figure 1:
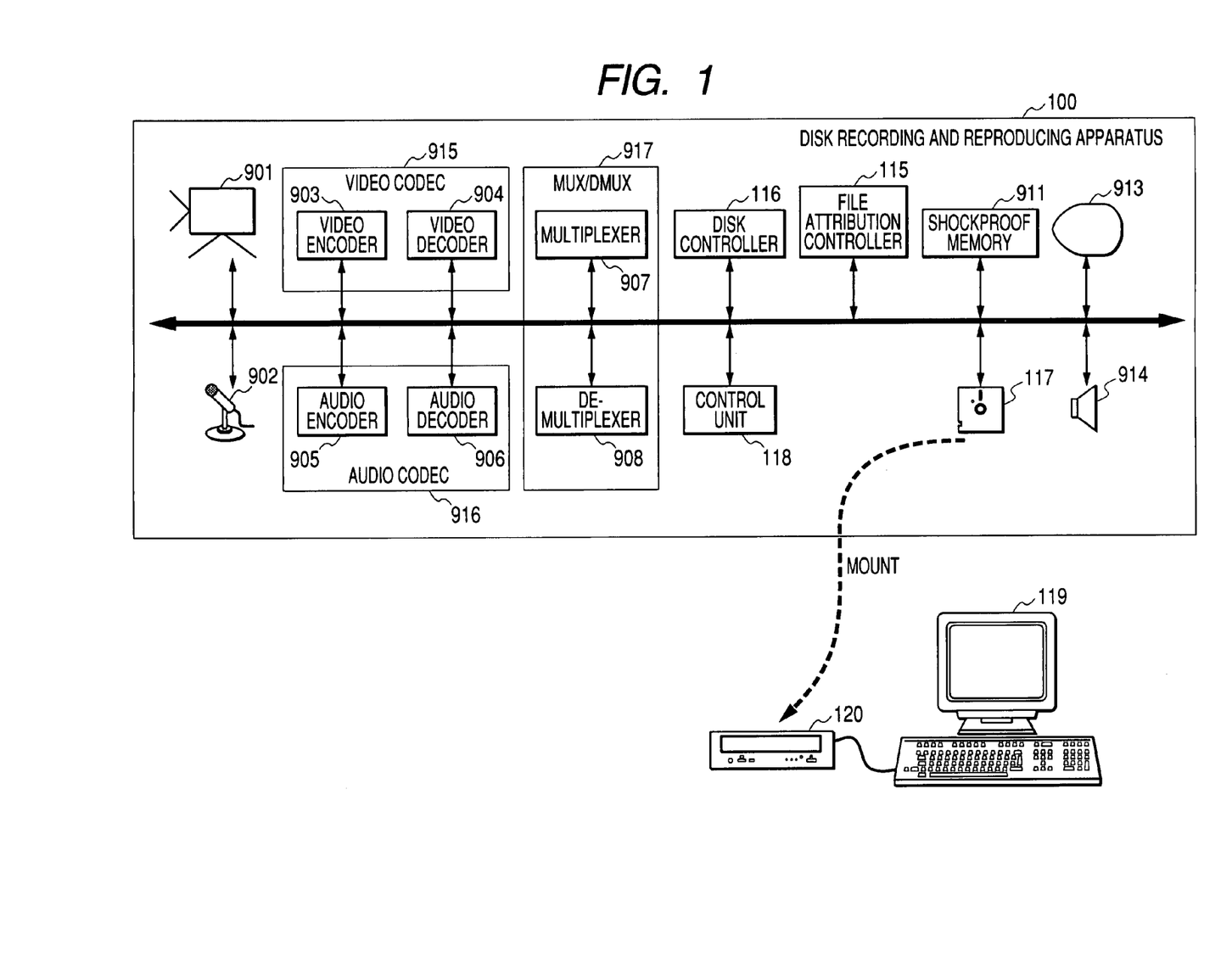
FIG. 1 is a block diagram showing an example of a configuration of a data management system in a first embodiment of the present invention.

FIG. 1 shows an example of a configuration of the data management system according to a first embodiment.

The data management system shown in FIG. 1 includes a disk recording and reproducing apparatus 100, a personal computer (PC) 119, and a disk apparatus 120. In the disk recording and reproducing apparatus 100, the picture taking function, the reproducing function, and the physical configuration of the disk are the same as the disk recording and reproducing apparatus 900 shown in FIG. 9. Therefore, blocks having the same configuration as those in FIG. 9 are by the same reference numerals and the detail description thereof is omitted. The disk recording and reproducing apparatus 100 has the configuration in which the video data and audio data can be recorded and reproduced by adopting an external reference type container format.

In FIG. 1, the reference numeral 115 denotes a file attribution controller which performs the control of attribution of the file in which the taken picture is recorded, the control of an external reference file, and formation of a container file. The file attribution controller 115 performs the control while focusing on a file identifier descriptor 200 shown in FIG. 2 among descriptors defined by the UDF format.

Figure 2:
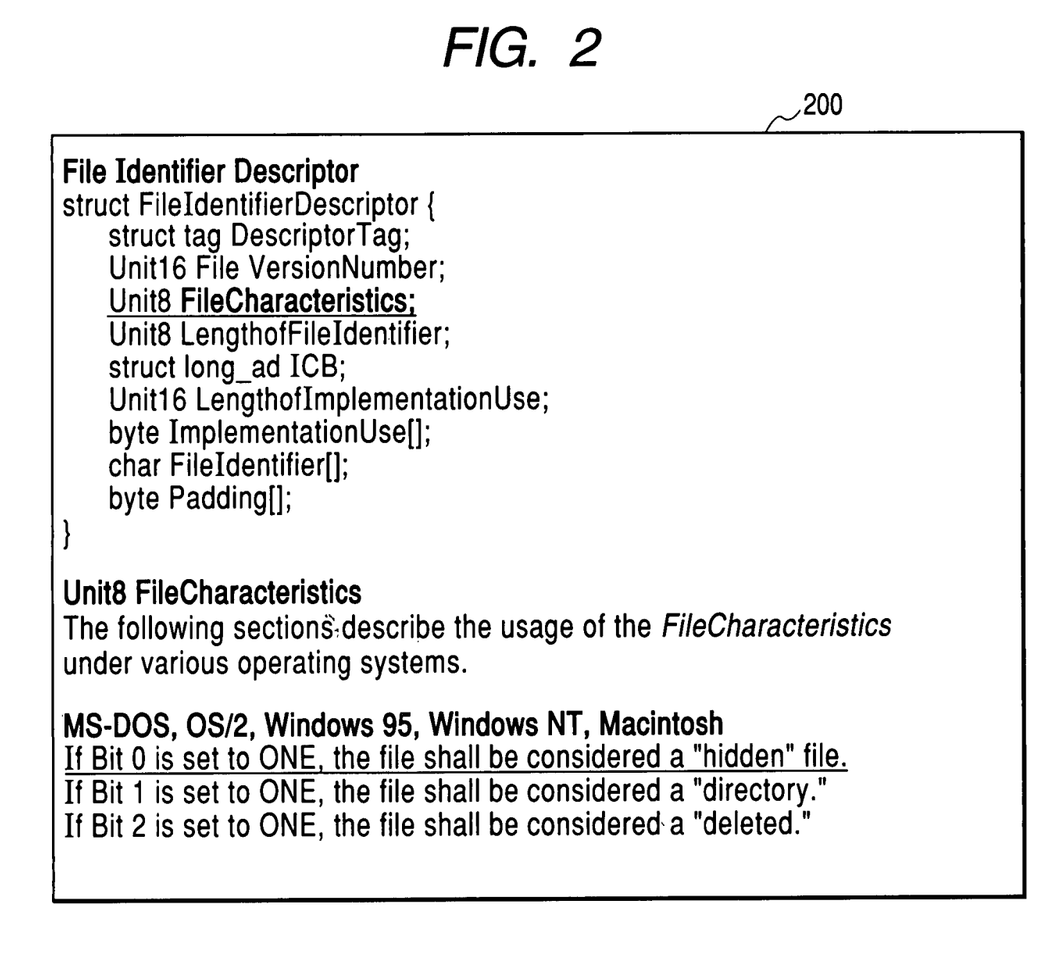
FIG. 2 shows an example of contents of a File Identifier Descriptor of a UDF format in the first embodiment of the invention.

LSB of an eight-bit parameter (File Characteristics) in the descriptor 200 is flag information indicating whether the designated file is in a visible state ("not hidden") or an invisible state ("hidden"). The "hidden" state (invisible state) means that the file exists but the file is not included in a file list display and, as a result, the user can not select the file.

In the present embodiment, LSB of the eight-bit parameter (File Characteristics) is set to all the generated external reference type container files to cause the container files to be in the "hidden" state. In the case where the file is set to a "hidden" attribution, usually the file becomes invisible, and the user cannot select the file. However, in the embodiment, it is assumed that a main body (disk recording and reproducing apparatus 100) usually displays all the container files while neglecting the flag indicating "hidden." Therefore, in this state, the audiovisual data (multiplexed and encoded video data and audio data) can be reproduced by selecting the external reference file in the usual manner.

The reference numeral 116 denotes the disk controller. The disk controller 116 controls the read and writing of the encoded video data and audio data and the container file on the disk medium 117 on the basis of the control of the file attribution controller 115. Further, the disk controller 116 controls the read and writing of the file attribution information, the external reference file information, and the like.

The reference numeral 117 denotes the disk medium (DISK) which stores the multiplexed and encoded video data and audio data, the container file, the file attribution information, the external reference file information, and the like.

The reference numeral 118 denotes a control unit which controls the overall disk recording and reproducing apparatus 100.

At this point, it is assumed that the disk medium 117 on which the data has been recorded is mounted on the disk apparatus 120 connected to another apparatus (generally personal computer (PC) 119) by a certain method. The disk apparatus 120 has at least a function of reproducing information from the disk medium, and PC 119 has a general reproducing application.

The conformity to the UDF format allows all the created files to be listed. When the user can confirm the container file, i.e. when the container file is in a visible state, the user always tries to reproduce the container file. Nevertheless, in the case where the data file of the target reference is the encoding method which is not supported by the reproducing application supporting the container format, the data can not be normally reproduced.

Therefore, the operating system of PC 119 automatically performs an invisible operation in such a manner that the external reference type container file is set to the "hidden" attribution (invisible state attribution) by adopting the technique of the invention. Consequently, the container file having the "hidden" attribution (invisible state) can not be selected by the user of PC 119.

Figure 3:
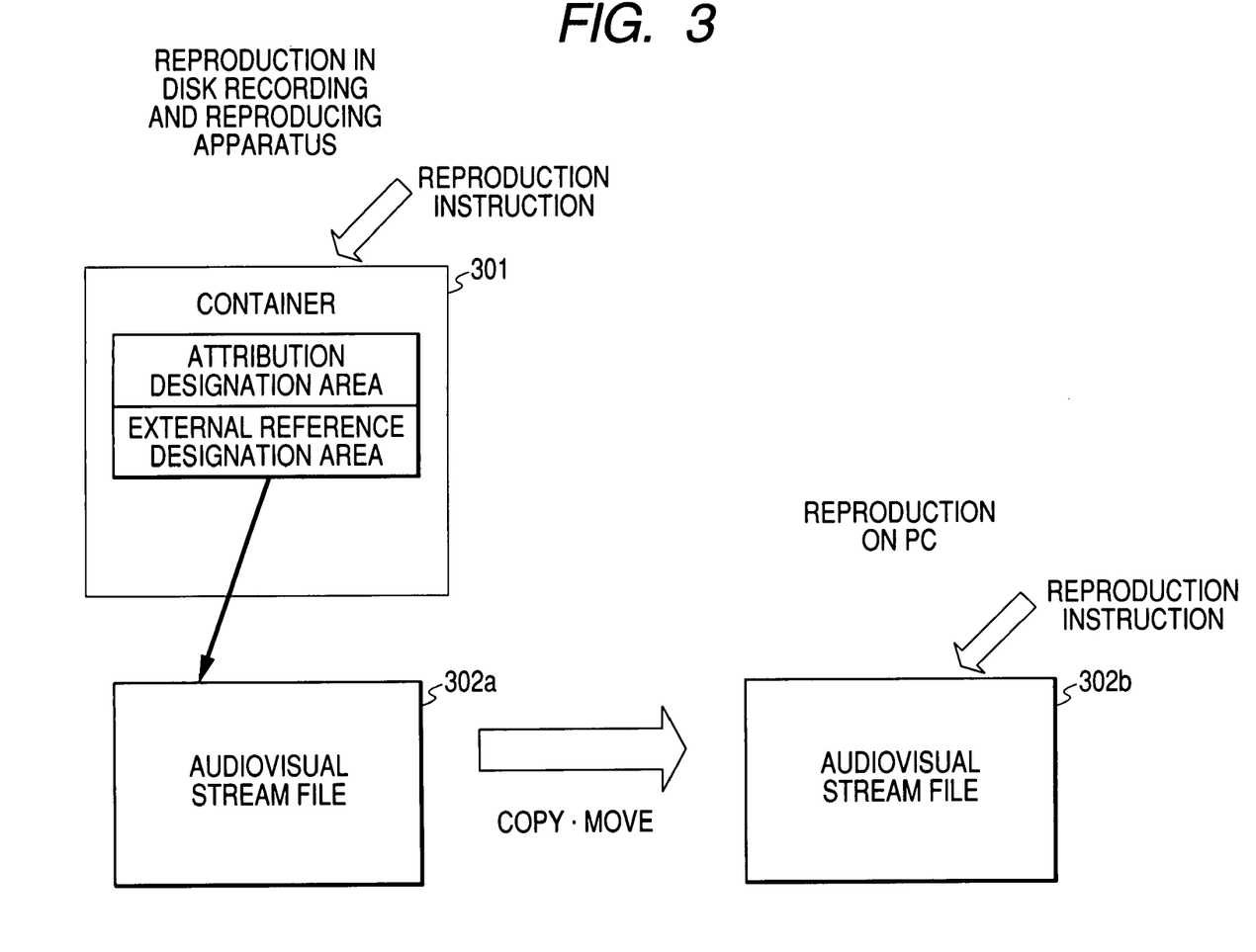
FIG. 3 shows a schematic diagram of operation when data is reproduced in the first embodiment of the invention.

FIG. 3 shows this situation. In FIG. 3, the reference numeral 301 denotes the external reference type container file, the reference numeral 302a denotes the audiovisual stream file (multiplexed and encoded video data and audio data) in the disk recording and reproducing apparatus, and the reference numeral 302b denotes the audio visual stream file in PC. The audiovisual stream files 302a and 302b are the same file.

According to the configuration of the embodiment, as shown in FIG. 3, the file to which the PC user can instruct the reproduction is not the container file 301 (invisible state) but only the audiovisual stream file 302b.

The audiovisual stream files 302a and 302b are not restricted by the container format, and usually the audiovisual stream files 302a and 302b are in the international standard format itself defined by MPEG or the like. Therefore, while the function such as the reproduction effect is restricted, the audiovisual stream files 302a and 302b have higher versatility compared with the container format reproducing application. Consequently, even if the encoding method which is not supported by the reproducing application compatible with the container format is adopted in the external PC or the like, the reproducible possibility is given by other reproducing applications.

Specifically, it is assumed that QuickTime is adopted as the container application. In this case, in the conventional technique, when an AC3 codec is adopted as the audio encoding method, the audio data can not be reproduced by the QuickTime reproducing application.

On the other hand, in the embodiment, assuming that the audiovisual stream file 302a is formed in a MPEG-2 PS (Program Stream) format, the video data and the audio data can be reproduced without any trouble by using the general PC application specializing in reproducing a DVD, even if the encoding method of the video data is MPEG-2 and the encoding method of the audio data is AC3. Generally, since such a PC application is supplied with the corresponding disk drive, it is also possible to solve the problem that the video data and the audio data can not be easily reproduced on PC 119, and it is possible that the user does not feel uncomfortable, i.e. it is possible to solve user harassment.

As described above, in the embodiment, the management of the external reference type container file 301 is performed by designating the hidden attribution to all the external reference type container files 301 formed by the disk recording and reproducing apparatus 100. As a result, while the container file 301 can be reproduced in the main body, only the reproduction of the audiovisual stream file 302b can be instructed in PC 119. This allows the data to be normally reproduced, even if the audiovisual data is copied or moved to another apparatus or system. For multimedia data using the external reference type container format, the easy linkage can be made between the apparatus such as the disk recording and reproducing apparatus 100 and PC 119.

Second Embodiment

Then, a second embodiment of the invention will be described. The same constituents as those shown in FIGS. 1 to 3 are indicated by the same reference numerals, and the detail description thereof is omitted.

Figure 4:
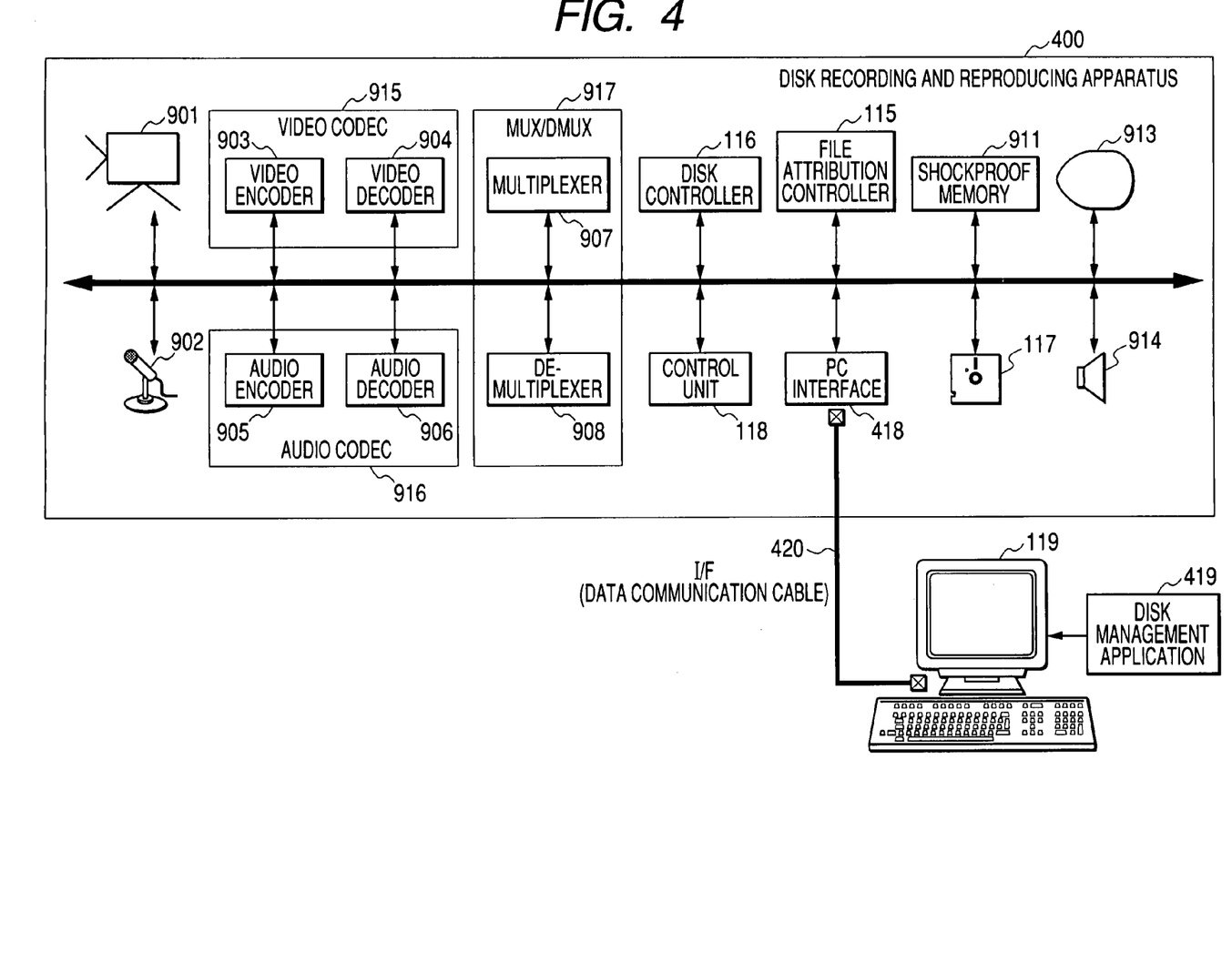
FIG. 4 is a block diagram showing an example of the configuration of the data management system in a second embodiment of the invention.

FIG. 4 shows an example of the configuration of the data management system in the second embodiment. The data management system shown in FIG. 4 includes a disk recording and reproducing apparatus 400 and the personal computer (PC) 119.

In the disk recording and reproducing apparatus 400, the reference numeral 418 denotes a PC interface which can perform data communication between the disk recording and reproducing apparatus 400 and PC 119. The control unit 118 controls the overall disk recording and reproducing apparatus 400, and the control unit 118 also controls the communication between the disk recording and reproducing apparatus 400 and the PC 119.

In the embodiment, the recorded disk medium 117 is not directly mounted on PC 119, but the PC 119 is connected to the disk recording and reproducing apparatus 400 through an interface (data communication cable) 420. It is preferable that the interface 420 is a digital data transmission type interface. For example, a wire type such as a USB (Universal Serial Bus) and an IEEE1394 serial bus and a wireless type can be used as the interface 420.

In FIG. 4, the reference numeral 419 denotes a disk file management application operated on the PC 119.

Although a mode of the PC interface 418 is not limited in the embodiment, the PC interface 418 is characterized in that at least the operating system on the PC 119 is not mounted as a recognizable volume or the files recorded on the disk medium 117 remotely mounted through the PC interface 418 are displayed in the list through the dedicated disk management application 419.

Figure 5:
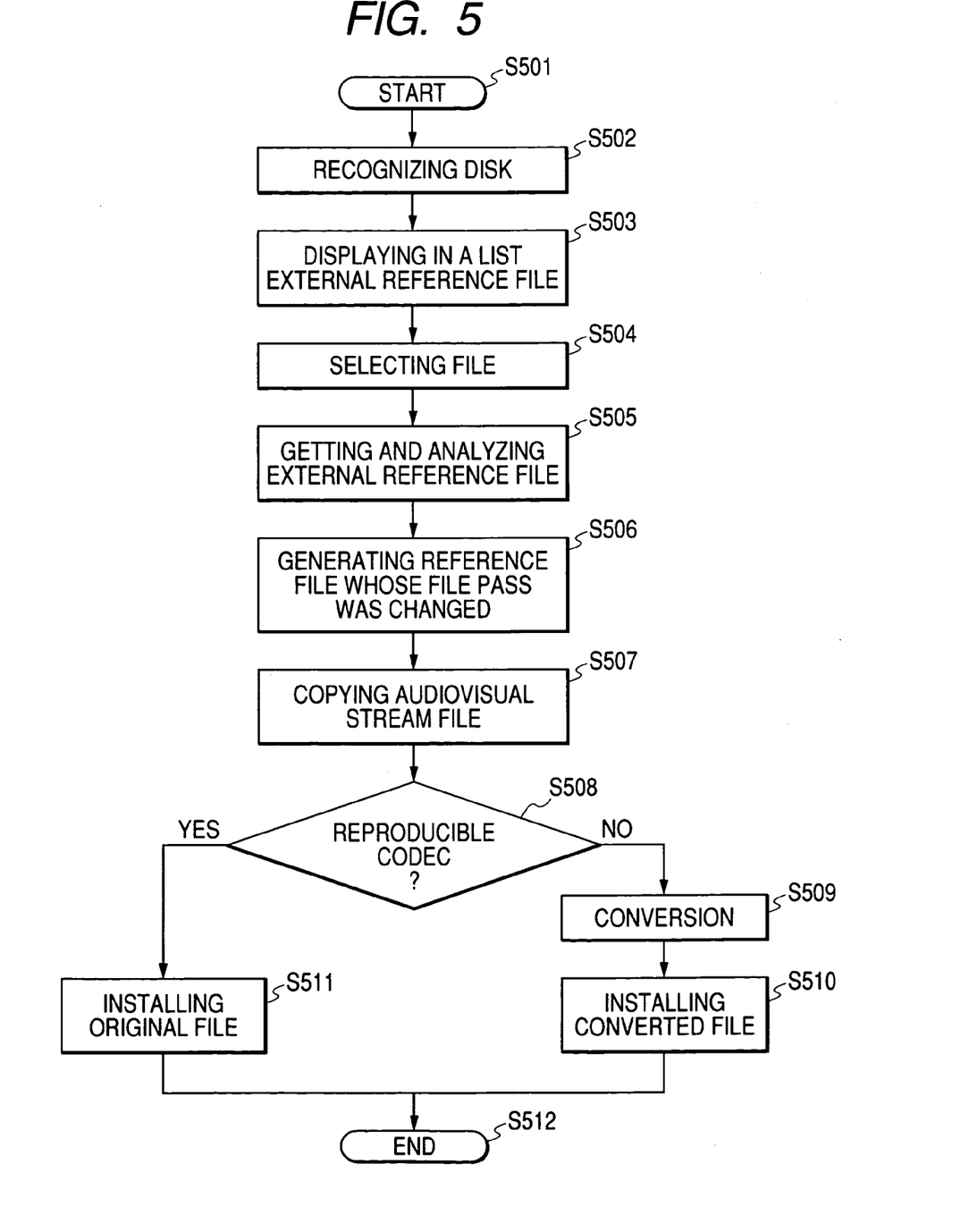
FIG. 5 shows an example of a flow chart of the operation executed by a disk management application in the second embodiment of the invention.

FIG. 5 shows a flow chart of the operation executed by the disk management application of the embodiment.

The flow is started (Step S501), the disk medium 117 onto which the recording has been performed is recognized (Step S502), and then the list of the external reference type files on the disk medium 117 is displayed (Step S503). At this point, even if the flag showing "hidden" described in the first embodiment is set, the container file 301 to which the flag is set is forcefully displayed.

Then, the external reference type container file 301 is selected by the user (Step S504), and the instruction of copying the container file 301 on to PC 119 is given. After obtaining the external reference type container file 301, the container file 301 is analyzed (Step S505), and the file pass of the audiovisual stream file 302a of the target reference is confirmed. In the case where the file pass is an absolute pass, because the container file 301 is not normally referred to in the target drive such as the hard disk drive when the container file is directly copied, the external reference type container file whose file pass has been changed to a relative pass is generated and stored in consideration of setting places of the container file and the audiovisual stream file 302b after the copying operation (Step S506).

Then, the copying of the audiovisual stream file is executed (Step S507). At this point, it is decided whether the codec which can be reproduced by PC 119 is adopted or not (Step S508). In the case where the codec is not adopted in Step S508, if necessary, format conversion is performed (Step S509) and the audiovisual stream file which has been converted is set (Step S510).

In the case where the codec which can be reproduced by PC 119 is adopted in step S508, the original audiovisual stream file 302b is set (Step S511). Then, the flow is finished (Step S512).

Figure 6:
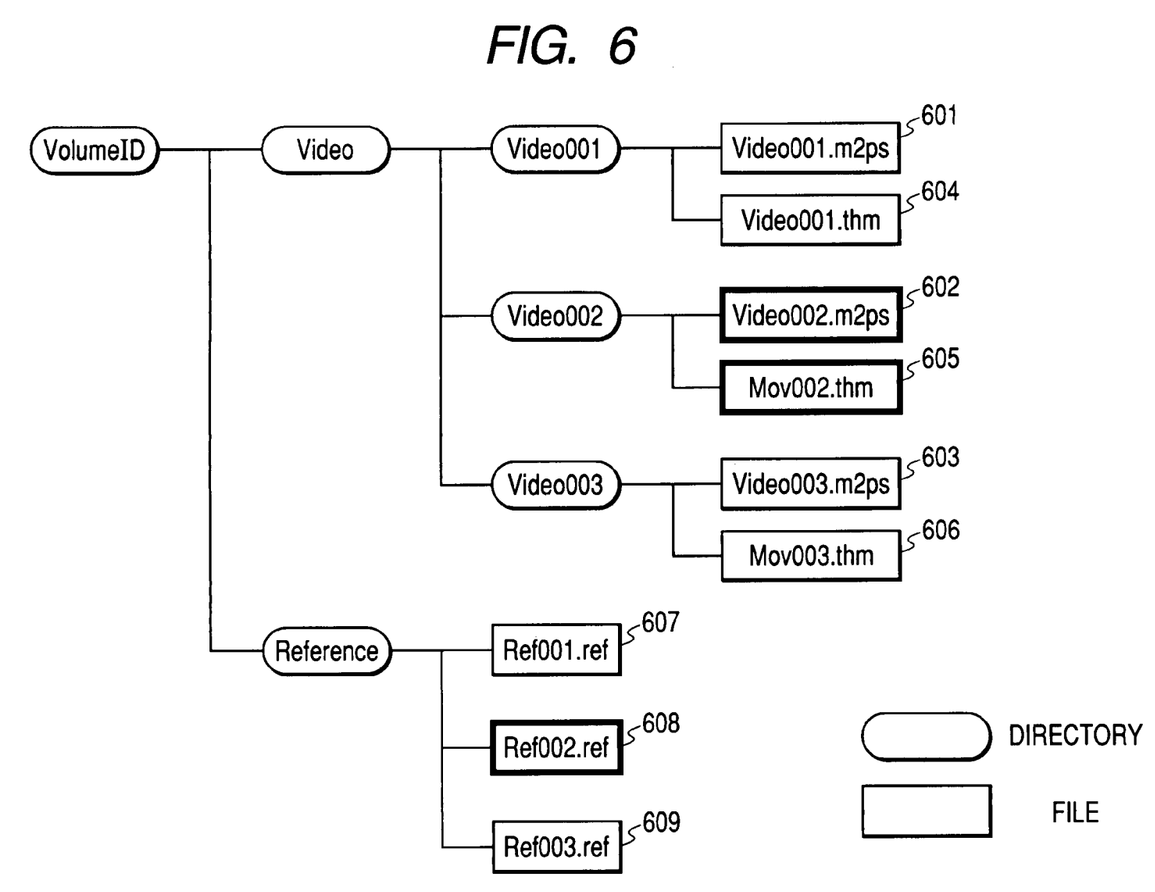
FIG. 6 shows an example of a discrete hierarchy on a disk medium in the second embodiment of the invention.

FIG. 6 shows a specific example of the file pass in the original disk medium 117. In FIG. 6, it is assumed that one recording file corresponds to one directory.

In files (Video001.m2 ps to Video003.m2 ps) 601 to 603, it is assumed that the audiovisual stream file is recorded in the MPEG-2 PS format.

Although files (Video001.thm to Video003.thm) 604 to 606 are shown as a thumbnail image, it is not always necessary that the files 604 to 606 are the thumbnail image.

Files (Ref001.ref to Ref003.ref) 607 to 609 are the external reference type container files, and the files 607 to 609 refer to the files (Video001.m2 ps to Video003.m2 ps) 601 to 603 respectively.

Assuming that the file passes of file (Video002.m2 ps) 602 and the external reference type file 608 include the volume ID, the volume ID becomes as follows:

VolumeID/Video/Video002/Video002.m2 ps

VolumeID/Reference/Video002.ref

Because the volume ID is unique in the disk medium 117, during the copying operation, the volume ID is substituted as follows:

./VolumeID/Video/Video002/Video.002.m2 ps

./VolumeID/Reference/Video002.ref

The reference can be accurately performed by the above substitution. After the substitution, the volume ID does not designate the physical ID of the disk medium 117, but the volume ID becomes a name of the directory newly generated in the disk on PC 119.

A ROM, a flexible disk, the hard disk drive, the optical disk, a magneto-optical disk, a CD-ROM, a CD-R, magnetic tape, a non-volatile memory card, and the like can be used as the recording medium supplying the program code of the disk management application 419.

Another Embodiment of the Invention

Figure 10:
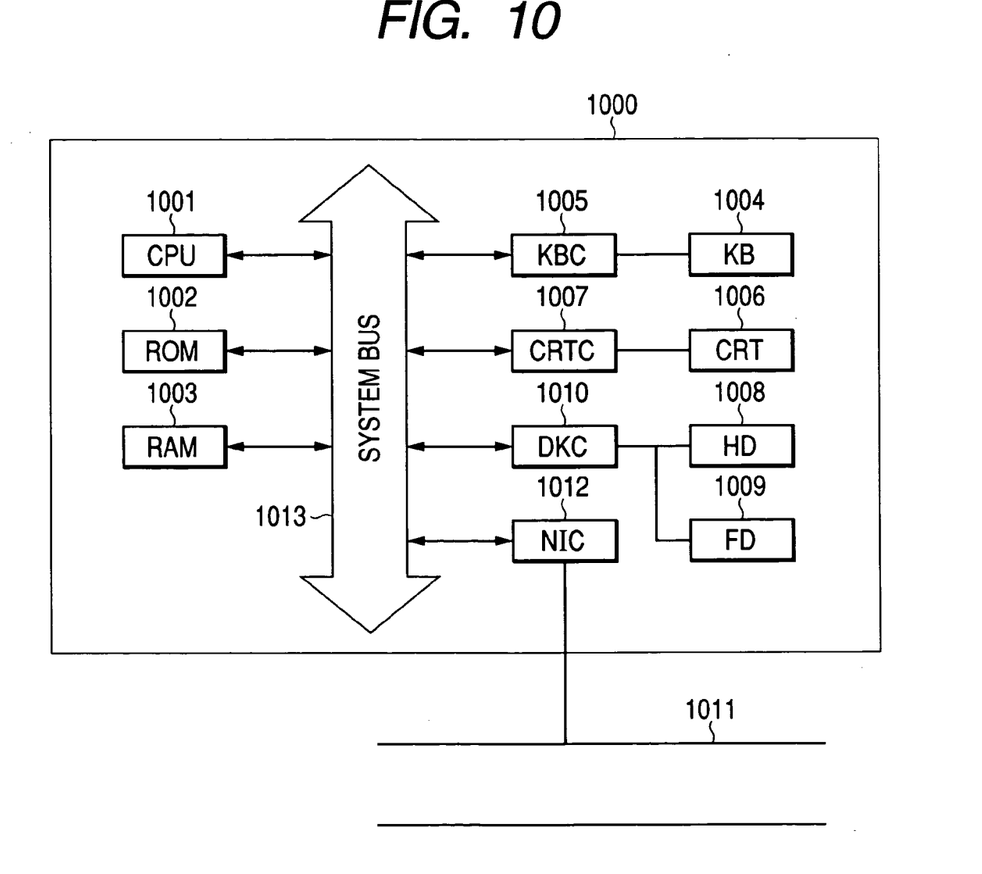
FIG. 10 is a block diagram showing an example of the configuration of a computer system provided in the data management system in another embodiment of the invention.

The control operation by the data management system in each embodiment can be realized by the use of the computer system shown in FIG. 10. FIG. 10 is a block diagram showing an example of the configuration of the computer system provided in the data management system such as PC 119. In a computer system 1000 shown in FIG. 10, CPU 1001, ROM 1002, RAM 1003, a keyboard (KB) 1004, a keyboard controller (KBC) 1005, a CRT display (CRT) 1006 which is of the display unit, a CRT controller (CRTC) 1007, a hard disk drive (HD) 1008, a flexible disk drive (FD) 1009, a disk controller (DKC) 1010, and a network interface controller (NIC) 1012 are configured to be communicably connected to a network 1011 through a system bus 1013.

CPU 1001 controls each constituent unit connected to the system bus 1013 as a whole by executing software stored in ROM 1002 or HD 1008 or the software supplied from FD 1009.

Namely, CPU 1001 performs control for realizing the later-mentioned operation by reading the processing program according to a predetermined processing sequence from ROM 1002, HD 1008, or FD 1009 to execute the processing program.

RAM 1003 functions as a main memory, a work area, or the like of CPU 1001. KBC 1005 controls instruction input from KB 1004, a pointing device (not shown), or the like.

CRTC 1007 controls the display of CRT 1006. DKC 1010 controls the access to HD 1008 and FD 1009, which store a boot program, various applications, an edit file, a user file, a network management program, the predetermined processing program of the embodiment, and the like.

NIC 1012 bidirectionally exchanges data with the apparatus or the system on the network 1011.

The invention also includes the mode in which the program code of the software for realizing the functions of the above-described embodiment is supplied to the computer in the apparatus or system connected to various kinds of devices and the various kinds of devices are operated according to the program stored in computer (CPU or MPU) of the system or apparatus so that various devices are operated in order to realize the functions of the above-described embodiments.

In this case, the program code itself of the software realizes the functions of the above-described embodiment, and the program code itself and means for supplying the program code to the computer, e.g. the recording medium storing the program code constitute the invention. For example the flexible disk, the hard disk drive, the optical disk, the magneto-optical disk, CD-ROM, the magnetic tape, a volatile memory card, and ROM can be used as the recording medium storing the program code.

The functions of the above-described embodiments are realized not only in such a manner that the computer executes the supplied program code, but also in such a manner that the program code cooperates with OS or other applications which are running on the computer. Needless to say, in this case, the program code also included in the invention.

Further, needless to say, the invention includes the case in which, after the supplied program code is stored in the memory provided in a function extension board of the computer or a function extension unit connected to the computer, CPU or the like provided in the function extension board or the function extension unit performs a part of or the whole of the actual processing on the basis of the instruction of the program code and the functions of the above-described embodiments are realized by the processing.

Many widely different embodiments of the present invention may be constructed without departing from the spirit and scope of the present invention. It should be understood that the present invention is not limited to the specific embodiments described in the specification, except as defined in the appended claims.

What is claimed is:

1. A reproducing method for reproducing data recorded on a recording medium attached to a reproducing apparatus, comprising:
a recording step of generating a plurality of directories including at least first and second directories different from each other on the recording medium, recording a video stream file in the first directory on the recording medium, and recording container files one of which supports the video stream file, in the second directory on the recording medium,
   wherein one of the container files has a data structure of an external reference type for reproducing the video stream file recorded in the first directory and includes link information for providing a link to the video stream file;
a file attribution setting step of setting file attributions of all of the container files recorded in said recording step into an invisible state so as to prohibit the container files from being displayed;
a recognition step of recognizing records recorded on the recording medium in said recording step, in response to start of a reproduction operation of the recording medium;
a display control step of reproducing one or more of the container files from the second directory on the recording medium recognized in said recognition step to produce one or more reproduced container files, and controlling display of the one or more reproduced container files such that the one or more reproduced container files are forcibly displayed in a form of a file list on a display device installed in the reproducing apparatus in the case that the one or more reproduced container files are displayed only on the display device, even if the file attribution of each of the one or more reproduced container files has been set into the invisible state; and
a reproduction step of selecting one of the container files displayed in the form of the file list in said display step and reproducing the video stream file linked to the selected container file via the link information included therein, from the first directory on the recording medium in accordance with the link information included in the selected container file.

2. A method according to claim 1, wherein said file attribution setting step sets the file attribution indicating the invisible state into a file identifier descriptor of one or more of the container files in a universal disk format which is of a format of the recording medium.

3. A method according to claim 1, further comprising an encoding step of encoding video data and audio data according to Motion Picture Expert Group format, wherein said recording step records the video stream file which has been encoded in said encoding step.

4. A method according to claim 1, further comprising a forming step of forming one or more of the container files to designate or designates file pass of one or more data files.

5. A method according to claim 4, wherein said forming step forms a QuickTime type file as one or more of the container files.

6. A method according to claim 1, further comprising a link information changing step of changing the link information included in one or more of the container files to new link information, when one or more of the container files and one or more video stream files which are recorded on the recording medium are copied or moved in a second recording medium.

7. A method according to claim 1, further comprising an identification information changing step of changing volume identification information written in the recording medium to new volume identification information, when one or more of the container files and one or more video stream files which are recorded on the recording medium are copied or moved in a second recording medium.

8. A method according to claim 1, further comprising a picture taking step of generating the video data and audio data by performing a picture taking operation,
   wherein said recording step writes one or more video stream files based on generated video data and audio data and one or more of the container files onto the recording medium while performing the picture taking operation.

9. A reproducing system for reproducing data recorded on a recording medium attached to a reproducing apparatus, comprising:
a recorder which generates a plurality of directories including at least first and second directories different from each other on a recording medium, records a video stream file in the first directory on the recording medium, and records container files one of which supports the video stream file, in the second directory on the recording medium, wherein a predetermined container file has a data structure of an external reference type for reproducing the video stream file recorded in the first directory and includes link information for providing a link to the video stream file;

a file attribution setting unit which sets file attributions of all of the container files recorded in said recorder into an invisible state so as to prohibit the container files from being displayed;

a recognizer which recognizes records recorded on the recording medium by said recorder, in response to start of a reproduction operation of the recording medium;

a display controller which reproduces one or more of the container files from the second directory on the recording medium recognized by said recognizer to produce one or more reproduced container files and controls display of the one or more reproduced container files such that the one or more reproduced container files are forcibly displayed in a form of a file list on a display device installed in the reproducing apparatus in the case that the one or more reproduced container files are displayed only on the display device, even if the file attribution of each of the one or more reproduced container files has been set into the invisible state; and a reproducer which selects one of the container files displayed in the form of the file list by said display controller and reproduces the video stream file linked to the selected container file via the link information included therein, from the first directory on the recording medium in accordance with the link information included in the selected container file.

10. A reproducing apparatus for reproducing data recorded on a recording medium attachable to said reproducing apparatus, comprising:

a recorder which generates a plurality of directories including at least first and second directories different from each other on a recording medium, records a video stream file in the first directory on the recording medium, and records container files one of which supports the video stream file, in the second directory on the recording medium, wherein one of the container files has a data structure of an external reference type for reproducing the video stream file recorded in the first directory and includes link information for providing a link to the video stream file;

a file attribution setting unit which sets file attributions of all of the container files recorded in said recorder into an invisible state so as to prohibit the container files from being displayed;

a recognizer which recognizes records recorded on the recording medium by said recorder, in response to start of a reproduction operation of the recording medium;

a display controller which reproduces one or more of the container files from the second directory on the recording medium recognized by said recognizer to produce one or more reproduced container files and controls display of the one or more reproduced container files such that the one or more reproduced container files are forcibly displayed in a form of a file list on a display device installed in said reproducing apparatus in the case that the one or more reproduced container files are displayed only on the display device, even if the file attribution of each of the one or more reproduced container files has been set into the invisible state; and a reproducer which selects one of the container files displayed in the form of the file list by said display controller and reproduces the video stream file linked to the selected container file via the link information included therein, from the first directory on the recording medium in accordance with the link information included in the selected container file.

11. A recording apparatus for recording data on a recording medium which is attachable to a reproducing apparatus, comprising:

a recorder which generates a plurality of directories including at least first and second directories different from each other on a recording medium, records a video stream file in the first directory on the recording medium, and records container files one of which supports the video stream file, in the second directory on the recording medium, wherein one of the container files has a data structure of an external reference type for reproducing the video stream file recorded in the first directory and includes link information for providing a link to the video stream file;

a file attribution setting unit which sets file attributions of all of the container files recorded in said recorder into an invisible state so as to prohibit the container files from being displayed;

a recognizer which recognizes records recorded on the recording medium by said recorder, in response to start of a reproduction operation of the recording medium;

a display controller which reproduces one or more of the container files from the second directory on the recording medium recognized by said recognizer to produce one or more reproduced container files and controls display of the one or more reproduced container files such that the one or more reproduced container files are forcibly displayed in a form of a file list on a display device installed in said reproducing apparatus in the case that the one or more reproduced container files are displayed only on the display device, even if the file attribution of each of the one or more reproduced container files has been set into the invisible state; and a reproducer which selects one of the container files displayed in the form of the file list by said display controller and reproduces the video stream file linked to the selected container file via the link information included therein, from the first directory on the recording medium in accordance with the link information included in the selected container.

12. An apparatus according to claim 11, wherein said file attribution setting unit sets the file attribution indicating the visible state into a file identifier descriptor of the container in a universal disk format, which is of a format of the recording medium.

13. An apparatus according to claim 11, further comprising an encoder which encodes video data and audio data according to Motion Picture Expert Group format, wherein said recorder records the video stream file which has been encoded as one or more data files by said encoder.

14. An apparatus according to claim 11, further comprising a generator which generates one or more of the container files to designate or designates file pass of one or more data files.

15. An apparatus according to claim 14, wherein said generator generates a QuickTime type file as one or more of the container files.

16. An apparatus according to claim 11, further comprising a camera which generates video data and audio data by performing a picture taking operation, wherein said recorder writes one or more video stream files based on generated video data and audio data and one or more of the container files onto the recording medium while performing the picture taking operation.

* * * * *